United States Patent
Hattori

(10) Patent No.: US 8,786,159 B2
(45) Date of Patent: Jul. 22, 2014

(54) FIXING STRUCTURE FOR STATOR CORE AND ROTATING ELECTRIC MACHINE INCLUDING THE SAME

(75) Inventor: Hiroyuki Hattori, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 92 days.

(21) Appl. No.: 13/514,850

(22) PCT Filed: Dec. 28, 2009

(86) PCT No.: PCT/JP2009/071750
§ 371 (c)(1),
(2), (4) Date: Jun. 8, 2012

(87) PCT Pub. No.: WO2011/080817
PCT Pub. Date: Jul. 7, 2011

(65) Prior Publication Data
US 2012/0242186 A1  Sep. 27, 2012

(51) Int. Cl.
*H02K 1/00* (2006.01)

(52) U.S. Cl.
USPC .............. 310/216.118; 310/89; 310/216.008; 310/216.009

(58) Field of Classification Search
USPC ............ 310/216.118, 216.001–216.137, 409, 310/89, 91, 216.008, 216.009, 401–403, 310/422
See application file for complete search history.

(56) References Cited

U.S. PATENT DOCUMENTS

| | | | | |
|---|---|---|---|---|
| 4,881,001 A | * | 11/1989 | Patel et al. | 310/216.052 |
| 4,894,574 A | * | 1/1990 | Ragaly | 310/411 |
| 7,235,905 B2 | * | 6/2007 | Matsubara et al. | 310/89 |
| 7,737,599 B2 | | 6/2010 | Hattori | |
| 2005/0116561 A1 | | 6/2005 | Matsubara et al. | |
| 2009/0021104 A1 | | 1/2009 | Hattori | |

FOREIGN PATENT DOCUMENTS

| | | |
|---|---|---|
| JP | 9-182359 A | 7/1997 |
| JP | 2007-228725 A | 9/2007 |
| JP | 2007-306751 A | 11/2007 |
| JP | 2008-245352 A | 10/2008 |
| JP | 2009-142031 A | 6/2009 |

OTHER PUBLICATIONS

International Search Report of PCT/JP2009/071750, dated Feb. 2, 2010.

* cited by examiner

*Primary Examiner* — Tran Nguyen
*Assistant Examiner* — Leda Pham
(74) *Attorney, Agent, or Firm* — Sughrue Mion, PLLC

(57) ABSTRACT

A fixing structure for a stator core includes a stator core, a ring member fitting on the stator core, and a case covering the stator core and the ring member. The case includes a fixing portion fixing the ring member, and a fitting portion fitting on the ring member.

4 Claims, 1 Drawing Sheet

FIXING STRUCTURE FOR STATOR CORE AND ROTATING ELECTRIC MACHINE INCLUDING THE SAME

CROSS REFERENCE TO RELATED APPLICATIONS

This application is a National Stage of International Application No. PCT/JP2009/071750 filed Dec. 28, 2009, the contents of all of which are incorporated herein by reference in their entirety.

TECHNICAL FIELD

The present invention relates to a fixing structure for a stator core and a rotating electric machine including the same. More particularly, the present invention relates to a fixing structure for a stator core, in which a ring member is provided at an outer circumferential portion of the stator core and the ring member is attached to a case, and a rotating electric machine including the fixing structure.

BACKGROUND ART

Conventionally, a fixing structure for a stator core is disclosed in, for example, Japanese Patent Laying-Open No. 2008-245352 (PTL 1), Japanese Patent Laying-Open No. 2007-228725 (PTL 2) and Japanese Patent Laying-Open No. 2007-306751 (PTL 3).

CITATION LIST

Patent Literature

PTL 1: Japanese Patent Laying-Open No. 2008-245352
PTL 2: Japanese Patent Laying-Open No. 2007-228725
PTL 3: Japanese Patent Laying-Open No. 2007-306751

SUMMARY OF INVENTION

Technical Problem

A rotating electric machine described in PTL 1 includes a housing which accommodates a rotor and a stator, and a cover which closes an opening portion of the housing. An end plate member is made to contact the end surface on the opening portion side of the stator. One bolt is inserted from an opening on the opening portion side of a hole formed in the end plate member into one opening of a through hole and its top end protruding from the other opening of the through hole is fixed to the bottom of the housing. The other bolt is inserted from an opening formed in the cover and its top end protruding from the other opening of the hole is fixed to the end plate member.

In PTL 2, a fixing structure for a stator is equipped with a stator including a stator core, and a housing having an opening portion for accommodating the stator core. The housing includes: a first part which has a relatively small space between the inner peripheral surface of the opening portion and the stator core with its inner diameter of the opening portion constant; and a second part which has a relatively large space between the inner peripheral surface of the opening portion and the stator core and aligns with the first portion in the axial direction of the stator core.

A fixing structure for a stator core in PTL 3 is a fixing structure for stators housed in a housing so that a gap is formed between them and the inner circumferential surface of the housing. The structure includes: an annular stator core; a fastening member that is inserted into the stator core in the direction of the axis of the stator core, and fastens the stator core to the housing when its one end is fixed on the housing; and an abutment portion that is fixed at the axial end of the stator core positioned on the side axially opposite to the side where the fastening member is fixed on the housing, and is abutted against the inner circumferential surface of the housing.

In the conventional art, the bolt fastening portion of the stator is arranged near the stator insertion port having low rigidity, and thus, the case may become deformed. As a result, ease of assembly worsens and the shaft center accuracy decreases, which leads to generation of noise.

Thus, the present invention has been made to solve the aforementioned problems, and an object of the present invention is to provide a fixing structure for a stator core that allows suppression of deformation of a case, and a rotating electric machine using the fixing structure.

Solution to Problem

A fixing structure for a stator core according to the present invention includes: a stator core having one end and the other end axially spaced from each other; a ring member located on an outer circumferential side of the stator core and holding the stator core; and a case housing the stator core and the ring member, and having a fixing portion which fixes the ring member, and a fitting portion on which the ring member fits, wherein the ring member extends from the one end side to the other end side of the stator core, the ring member is fixed to the fixing portion on the one end side and fits on the fitting portion on the other end side, and an inner diameter of the fitting portion is smaller than an inner diameter of the fixing portion.

In the fixing structure for a stator core configured as described above, the one end of the stator core is fixed to the fixing portion and the other end fits on the fitting portion. Therefore, both ends of the stator core are attached to the case, and thus, it is unnecessary to fix the stator core at an opening portion having low rigidity and deformation of the case can be prevented.

Preferably, the case has an opening portion through which the stator core is inserted, and a radial thickness of the case at the fixing portion is larger than a radial thickness of the case at the opening portion.

Preferably, the ring member is fixed to the fixing portion by a bolt.

Preferably, an axial length of the fitting portion abutting the ring member is shorter than a length of a portion of the bolt fitted into the case.

Preferably, the ring member has a flange portion radially extending on the one end side.

A rotating electric machine according to the present invention includes the fixing structure for a stator core as described above.

DESCRIPTION OF EMBODIMENTS

Figure 1:
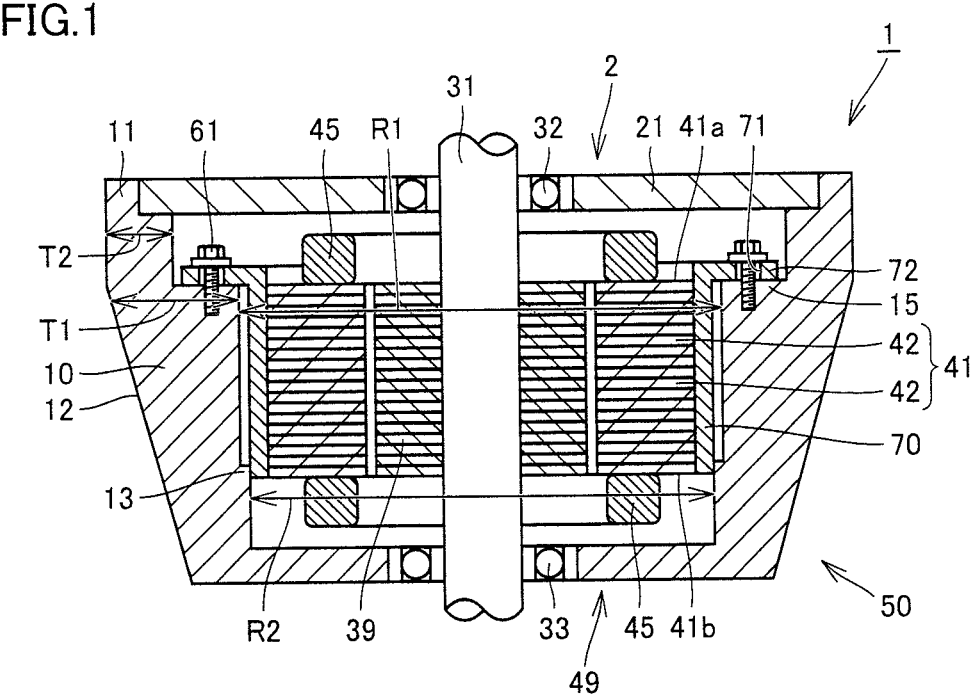
FIG. 1 is a cross-sectional view of a rotating electric machine having a fixing structure for a stator core according to a first embodiment of the present invention.

Embodiments of the present invention will be described hereinafter with reference to the drawings. In the following embodiments, the same or corresponding portions are denoted with the same reference characters and description thereof will not be repeated. The respective embodiments can also be combined.

(First Embodiment)

FIG. 1 is a cross-sectional view of a rotating electric machine having a fixing structure for a stator core according to a first embodiment of the present invention. Referring to FIG. 1, in a fixing structure 50 for a stator core, a ring member 70 is housed in a case 10. Ring member 70 supports rotating electric machine 2. Rotating electric machine 2 includes a rotor 39 and a stator 49 provided on the outer circumferential side of this rotor 39. Rotor 39 is formed by stacking electromagnetic steel plates. A shaft 31 is attached to rotor 39. Shaft 31 is held by bearings 32 and 33 so as to be rotatable.

Stator 49 is located on the outer circumferential side of rotor 39. Stator 49 has a stator core 41 and a coil 45 wound around stator core 41. A method for winding coil 45 may be distributed winding or concentrated winding. A copper wire constituting coil 45 may be a round wire or a rectangular wire.

Stator core 41 has a tubular shape, and rotor 39 is provided on the inner circumferential side thereof and the outer circumferential side thereof is in contact with ring member 70. Stator core 41 is formed by stacking electromagnetic steel plates 42.

Ring member 70 holds stator core 41. Ring member 70 provided on the outer circumferential side of stator core 41 extends from one end 41a to the other end 41b of stator core 41. One end 41a and the other end 41b define the axial length of stator core 41.

Coil 45 is in contact with end faces of one end 41a and the other end 41b.

Ring member 70 has a flange portion 72 extending radially, and a through hole 71 is provided in flange portion 72. A bolt 61 serving as a fastening portion is attached to penetrate through hole 71. Bolt 61 fixes flange portion 72 to case 10 at a plurality of locations. Bolt 61 may be replaced by other configurations such as a rivet.

Although FIG. 1 shows such a structure that bolt 61 is inserted into the case 10 side, the present invention is not limited thereto. An embedded bolt provided in case 10 may penetrate through hole 71 and a nut may be fastened to the embedded bolt in order to attach ring member 70 to case 10.

Furthermore, although bolt 61 is provided to extend axially in FIG. 1, bolt 61 may be attached to extend radially.

Bolt 61 is attached to a fixing portion 15 of case 10. Flange portion 72 of ring member 70 is in contact with fixing portion 15. Case 10 has an opening portion 11 and a cover 21 is fitted into opening portion 11. Opening portion 11 is a portion through which stator core 41 and ring member 70 are inserted. Opening portion 11 is sealed by cover 21 serving as a lid portion. A thickness T2 of case 10 near opening portion 11 is smaller than a thickness T1 of case 10 near fixing portion 15. An outer circumferential surface 12 of case 10 has a so-called tapered shape, i.e., an outer diameter thereof becomes smaller as a distance from opening portion 11 increases, and has a conical shape. It is to be noted that the outer circumference of case 10 does not always have to have the conical shape, and the diameter of the outer circumference may be constant. Furthermore, a step may be provided on outer circumferential surface 12.

A fitting portion 13 is a small-diameter portion provided on the lower side of case 10. Ring member 70 fits on fitting portion 13. Fitting portion 13 is in contact with ring member 70 to fix ring member 70.

Tubular case 10 has opening portion 11 and a bottom on the opposite side of opening portion 11. Fitting portion 13 is provided on the side close to the bottom, and fixing portion 15 is provided on the side close to opening portion 11.

Rotating electric machine 2 is a motor and generator for a transmission of a vehicle 1 such as a hybrid vehicle and an electric vehicle. Stator 49 is configured by stator core 41 and coil 45. Stator 49 constitutes a stator assembly, and the stator assembly is supported by case 10 near both end faces of one end 41a and the other end 41b. Ring member 70 is fastened and fixed to case 10 by bolt 61 on the opening portion 11 (stator insertion port) side of case 10, and the outer circumferential side surface of ring member 70 fits on fitting portion 13 on the opposite side. The axial length of fitting portion 13 is equal to or shorter than the fastening portion length of bolt 61, i.e., the length of a portion where bolt 61 is fitted into case 10 by screwing.

As a result, the stator assembly is supported on both sides of one end 41a and the other end 41b, and vibrations of the stator assembly can be suppressed. Furthermore, the accuracy of a rotation shaft center of the stator assembly can be enhanced. Deformation of case 10 when the stator assembly is fixed to case 10 by means of bolt 61 can be suppressed.

As a result, vibrations and noise of rotating electric machine 2 resulting from vibrations of stator 49 can be reduced. Enhancement of the accuracy of shaft 31 leads to reduction in vibrations of rotating electric machine 2. Ease of assembling cover 21 and stator 49 to case 10 is also enhanced. Furthermore, by relieving the stress, strength and reliability are enhanced.

In other words, fixing structure 50 for stator core 41 includes: stator core 41 having one end 41a and the other end 41b axially spaced from each other; ring member 70 located on the outer circumferential side of stator core 41 and holding stator core 41; and case 10 housing stator core 41 and ring member 70, and having fixing portion 15 which fixes ring member 70, and fitting portion 13 on which ring member 70 fits, wherein ring member 70 extends from the one end 41a side to the other end 41b side of stator core 41, ring member 70 is fixed to fixing portion 15 on the one end 41a side and fits on fitting portion 13 on the other end 41b side, and an inner diameter R1 of fitting portion 13 is smaller than an inner diameter R2 of the fixing portion.

The case has opening portion 11 through which the stator core is inserted, and radial thickness T1 of case 10 at fixing portion 15 is larger than radial thickness T2 of case 10 at opening portion 11.

Fixing portion 15 is fixed by bolt 61. The axial length of fitting portion 13 abutting ring member 70 is shorter than the length of a portion of bolt 61 fitted into case 10.

(Second Embodiment)

Figure 2:
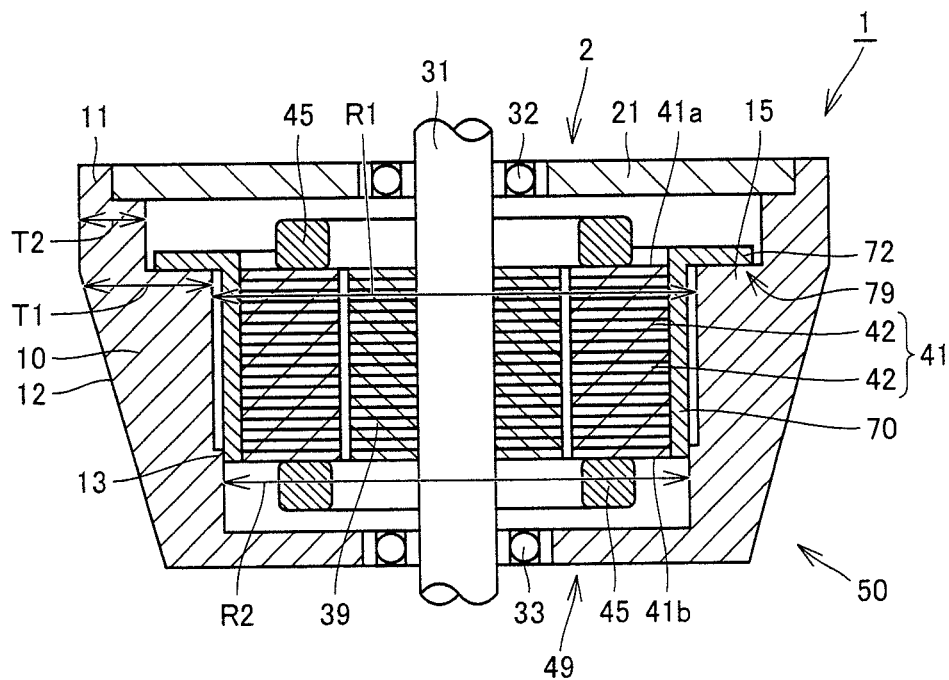
FIG. 2 is a cross-sectional view of a rotating electric machine having a fixing structure for a stator core according to a second embodiment of the present invention.

FIG. 2 is a cross-sectional view of a rotating electric machine having a fixing structure for a stator according to a second embodiment of the present invention. Referring to FIG. 2, rotating electric machine 2 according to the second embodiment of the present invention is different from rotating electric machine 2 according to the first embodiment in that flange portion 72 is fixed to case 10 by a welded portion 79. Specifically, ring member 70 is fixed to case 10 by means of the bolt in FIG. 1, whereas ring member 70 is fixed to case 10 by welding without using the bolt.

Although the embodiments of the present invention have been described above, the embodiments illustrated herein can be variously modified. Although case 10 having a cylindrical outer shape has been described, case 10 does not always have to have the cylindrical shape. Case 10 may have a square tubular shape.

Furthermore, rotating electric machine 2 according to these embodiments does not always have to be mounted on the vehicle and may be a rotating electric machine mounted on an object other than the vehicle.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

Reference Signs List 1 vehicle; 2 rotating electric machine; 10 case; 11 outer circumferential surface; 12 outer circumferential surface; 13 fitting portion; 15 fixing portion; 21 cover; 31 shaft; 32, 33 bearing; 39 rotor; 41 stator core; 41*a* one end; 41*b* the other end; 42 electromagnetic steel plate; 45 coil; 49 stator; 50 fixing structure; 61 bolt; 70 ring member; 71 through hole; 72 flange portion; 79 welded portion

The invention claimed is:

1. A fixing structure for a stator core, comprising:
    a stator core having one end and the other end axially spaced from each other;
    a ring member located on an outer circumferential side of said stator core and holding said stator core; and
    a case housing said stator core and said ring member, and having a fixing portion which fixes said ring member, and a fitting portion on which said ring member fits, wherein
    said ring member extends from said one end side to said other end side of said stator core, said ring member is fixed to said fixing portion on said one end side, and abuts and fits on the fitting portion on said other end side, an inner diameter of said fitting portion is smaller than an inner diameter of said fixing portion, and at said one end, a gap is radially provided between said ring member and said case,
    wherein
    said ring member is fixed to said fixing portion by a bolt,
    wherein
    an axial length of said fitting portion abutting said ring member is shorter than a length of a portion of said bolt fitted into said case.

2. The fixing structure for a stator core according to claim 1, wherein
    said case has an opening portion through which said stator core is inserted, and
    a radial thickness of said case at said fixing portion is larger than a radial thickness of said case at said opening portion.

3. The fixing structure for a stator core according to claim 1, wherein
    said ring member has a flange portion radially extending on said one end side.

4. A rotating electric machine including the fixing structure for a stator core as recited in claim 1.

* * * * *